United States Patent

[11] 3,596,141

[72] Inventors Richard Sterling Jones
3922 South 775 West, Bountiful, Utah 84010;
George Michael Stevenson, 2080 West 5900 South, Roy, Utah 84067
[21] Appl. No. 770,915
[22] Filed Oct. 28, 1969
[45] Patented July 27, 1971
Continuation-in-part of application Ser. No. D 13,109, Aug. 12, 1968.

[54] ELECTRICAL METER BOX
6 Claims, 7 Drawing Figs.
[52] U.S. Cl. .................................................. 317/107, 174/38, 174/45
[51] Int. Cl. .................................................. H02b 9/00
[50] Field of Search .................................................. 317/104–107; 174/37, 38, 52, 44, 45

[56] References Cited
UNITED STATES PATENTS
2,367,433  1/1945  Road .................................. 317/107 X
3,136,925  6/1964  Klein .................................. 317/107
3,225,224  12/1965  Rydbeck .......................... 174/52 X
2,985,261  5/1961  Kubesh .............................. 174/45

Primary Examiner—Lewis H. Myers
Assistant Examiner—Gerald P. Tolin
Attorney—David V. Trask ABSTRACT: An electrical meter box for the outdoor installation of a kilowatt hour meter is constructed with a housing having a portion of domelike configuration with an open bottom, a mounting ring over which the housing portion closely fits for stability, and an upstanding meter-receiving panel rigidly carried by the mounting ring. A pullbox section may be provided as part of the meter box, as also may a lamp post portion rising upwardly from the domelike portion and adapted to carry a luminaire for outdoor lighting. The panel is provided with bus bar mountings for electrical and meter-plug-in connections. The housing is preferably hingedly attached to the mounting ring for free-swinging covering and uncovering movement relative to the meter-mounting panel.

PATENTED JUL 27 1971  3,596,141

INVENTORS.
RICHARD STERLING JONES
GEORGE MICHAEL STEVENSON
BY
Mallinckrodt and
Mallinckrodt
ATTORNEYS

ELECTRICAL METER BOX

RELATED APPLICATIONS

This invention is a continuation-in-part of design Pat. application, Ser. No. D 13,109, filed Aug. 12, 1968, which discloses an ornamental design configuration for the housing portion of the meter box.

The present application describes and claims from a utilitarian standpoint the housing portion of the meter box, which preferably but not necessarily has the ornamental configuration claimed in the design patent application.

BACKGROUND OF THE INVENTION

1. Field

This invention relates to meter boxes for electric power distribution systems, especially those serving residential areas. Specifically, it relates to meter boxes for underground distribution systems and provides a novel protective meter box for outdoor installation that is especially useful in the form of a lamppost with luminaire or in the form of a temporary power dome.

2. State of the Art

Curbside meter pedestals are available which permit underground secondary electrical service to be connected from the front of a homeowner's lot. Such a pedestal is little more than a housing carrying meter-mounting and electrical-connection fittings on an interior wall face. The kilowatt hour service meter has been visible through a transparent portion of the pedestal base, or in some instances it has been connected to a remote register visible at some other more convenient location. The meter pedestal has been used as the base of a lamppost carrying a luminaire and has also included one or more convenience outlets for yard service.

Access to the meter has been through a hatchway provided in the pedestal. Such access hatchway tends to be unsightly and to introduce the risk of damage to the meter by acts of vandalism. Moreover, removal and replacement of the pedestal from its mounting involves the risk of damage to the meter and associate apparatus, as well as the anger of electrical contact with internal electrical wiring.

The telephone lines are also buried underground in modern installations. Access pedestals for telephone lines are invariably located near the back of a residential lot, because of their unsightly appearance. Accordingly, because it is desirable for a service man to be able to read kilowatt hour meters from the curb at the front of the lot, provision of both underground electrical and underground telephone service to a home presently requires ditching along both the front and back of the lot.

SUMMARY OF THE INVENTION

The present invention provides a novel housing and separate mounting for a kilowatt hour meter together with associate electrical connectors, resulting in a versatile and attractive distribution system for underground residential power supplies. The invention introduces significant economies into the distribution system by providing for junction connections of secondary and service entrance-conductors above ground. It further provides a system whereby the meter housing may be removed from and replaced over the kilowatt hour meter and associated apparatus with no danger of damage or electrical contact. Moreover, the apparatus of this invention is relatively secure from vandalism and theft. In addition, it can accommodate and distribute telephone wires through the same trenches and pullboxes employed for electrical power distribution.

The meter box of the invention includes a shaped meter housing in removable association with an anchoring ring that mounts an upstanding, meter-receiving bracket, usually of panel formation, mountings, for a conventional kilowatt hour meter and for electrical connection means used to establish junction connection with electrical supply conductors. The housing is removable from the meter mounting; a special hinge connection, may be employed between the ring and the housing, especially when the housing is in the form of a lamppost. The meter box may also include a novel pullbox adapted to receive and support the anchoring ring. Although the several components of the invention are preferably combined, certain of the components in themselves represent advances in the art and are useful for applications other than the particular meter box described herein.

In an installation according to this invention, trenches are dug in conventional fashion to receive the necessary primary and secondary conductors. A pullbox is located wherever required to permit proper access to the secondary supply conductors, and the trenches are filled with earth. The pullbox is preferably formed as a hollow cylinder of sufficient length to extend from the vicinity of a trench to the vicinity of the earth's surface and should have sufficient inside diameter to accommodate a plurality of heavy electric cables. Unlike conventional underground distribution systems, the secondary conductors are brought up through the pullbox and are connected above ground to the service conductors. Both the service conductors and the secondary conductors are strung from the aboveground junction connection back to the trenches for distribution to remote locations.

The secondary supply conductors and service conductors are held in position for making junction connections above ground by means associated with a special anchoring ring. Although the pullbox of this invention is of the general type conventionally employed for underground distribution systems, it is specifically adapted to receive such an anchoring ring on its top or upper surface. The pullboxes of the prior art to not so adapted, it being conventional practice to either secure a concentric cap over the top of the pullbox or to provide access into the top of the pullbox through a manhole-type cover.

In some embodiments of the invention the anchoring ring is integral with the pullbox, but it is usually preferred that it be a separate element with its undersurface adapted for placement against the top surface of the pullbox so that it may be shimmed with respect to the pullbox. In this fashion, even though the pullbox may be slightly out of plumb, either upon installation or subsequently due to minor earth movements, the anchoring ring can be leveled. The anchoring ring is rigidly fastened to the top of the pullbox and is adapted to support a mounting bracket and associated electrical apparatus as well as to function as an anchoring point for the meter housing portion. Accordingly, the outer perimeter of the ring is shaped and dimensioned so as to be entirely contained within the outer perimeter of the top surface of the pullbox.

The inside perimeter of the anchoring ring embraces sufficient area to provide adequate working access into the pullbox. In most instances, the bottom surface of the ring will rest entirely on the top surface of the pullbox so as not to restrict access into the pullbox. According to presently preferred embodiments, the pullbox is shaped as a hollow, generally cylindrical pedestal, with its upper surface formed as a flat, circular ring; the anchoring ring is shaped as a circular ring of uniform thickness, defined by concentric, short cylinders such that the outer diameter of the top of the pullbox is larger than the outer diameter of the anchoring ring, but the inner diameter of the top of the pullbox is smaller than or nearly equal to the inner diameter of the anchoring ring.

Fastened to the anchoring ring is a special mounting bracket in the form of a panel provided with bus bars and fittings adapted to receive a conventional kilowatt hour meter and electrical connectors. The mounting panel extends upwardly from attachment to the upper surface of the anchoring ring. In its preferred form, the front surface of the panel carries electrical connection means for junction connections of current-delivering (hot) conductors, and the back surface carries similar means for junction connections of neutral conductors. The front surface is further adapted to receive the meter in association with the electrical connection means. Also, the panel is preferably used for making splice connections of secondary cables.

The panel, meter, and anchoring ring are sized and dimensioned to fit within the meter housing portion of the meter box. This meter housing portion is hingedly attached to the anchoring ring for reasons of security; i.e., to prevent vandals or children from removing the housing from its anchoring ring and to fix the path traversed by the housing's wall as it is removed from or replaced over the ring. The shape of the interior of the meter housing portion is selected to avoid either mechanical or electrical contact of the housing with the meter, bracket, or any associated apparatus mounted above the anchoring ring.

The relationship of the sizes and shapes of the anchoring ring, mounting bracket and meter, and the meter housing is important. Thus, the inside perimeter of the bottom of the housing must be sized and dimensioned to snugly slip over the outer perimeter of the anchoring ring. Preferably the fit is sufficiently snug that it is necessary to lift the housing vertically to clear the anchoring ring. Accordingly, in its preferred pivotal attachment to the anchoring ring, a hinge is constructed with two pivot connections spaced horizontally from each other by sufficient distance to permit the vertical movement necessary for the housing to clear the anchoring ring. The hinge typically comprises a first stationary vertical element extending from attachment to the anchoring ring; a second stationary horizontal element extending from attachment to the inside surface of the housing; and a third connection element pivotally connected at its opposite ends to the distal ends of the respective stationary elements.

The size and positioning of the panel and meter with respect to the anchoring ring are such that the housing may be swung whenever necessary from its normally closed position, i.e. from a position vertically circumscribing the anchoring ring, to its open position, i.e. to a position essentially horizontal, with the plane of he base of the housing and the plane of the anchoring ring defining an angle of at least about 90°, or may be swung from that open position to that closed position, without contacting the panel or any of the apparatus supported by the panel. Thus, the panel, kilowatt hour meter and associated electrical connection means carried thereby, and all wiring incidental thereto, should fit within a domelike space defined by the interior wall surface of the housing. When the configuration of this domelike space is such that, with the housing in closed position fitting snugly around the ring, a curved line traced vertically on the interior surface of the housing, beginning at any point on the perimeter of the ring, and terminating above the center of the ring has a radius of curvature equal to the distance between its beginning point, through said center, to the point on the perimeter of the ring that is directly opposite said beginning point, the housing may be raised and pivoted from its ring-encircling closed position to fully open position on the special hinge mounting concealed within such housing without contacting any portion of panel, meter, or fittings associated with the ring.

The exterior configuration of the domelike housing below any auxiliary portion, such as a lamppost, may be as desired, although the described configuration for the interior is particularly attractive when applied to the exterior, especially in combination with a lamppost, as shown, and provides the basis for the afore-referred-to design patent application.

As has been indicated, the meter housing portion of the meter box may be embodied in various forms, depending upon the intended use for the power being distributed or the personal preference of a power consumer. Thus, it may be formed as a simple cap or bonnet to shield the meter and junction connections from he elements, nd such bonnet may be adapted by the inclusion of appropriate circuit breakers and power outlets, as a temporary power dome for the supply of construction power to building contractors. After the contractor has completed construction in the area, the temporary bonnet or power dome may be replaced with a luminaire having the base of its lamppost portion formed as the housing portion of he meter box. The lamppost ideally carries a remote register located at a convenient height on the post for reading by a utility meter reader. The base of the lamppost may include one or more convenience outlets.

DESCRIPTION OF THE DRAWINGS

In he drawings, which illustrate apparatus presently contemplated as the best mode of carrying out the invention.

DESCRIPTION OF THE ILLUSTRATED EMBODIMENTS

Figure 1:
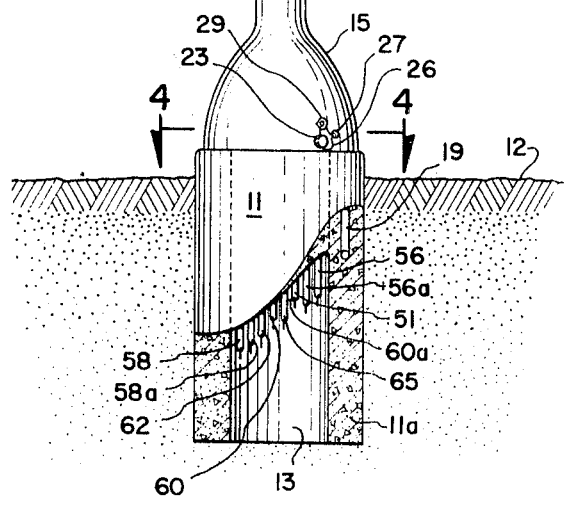
FIG. 1 is view in elevation and partly in vertical axial section of a lamppost, including a housing portion at the base hinged to a pullbox, the illustrated apparatus constituting one form of meter box in accordance with the invention.
Figure 2:
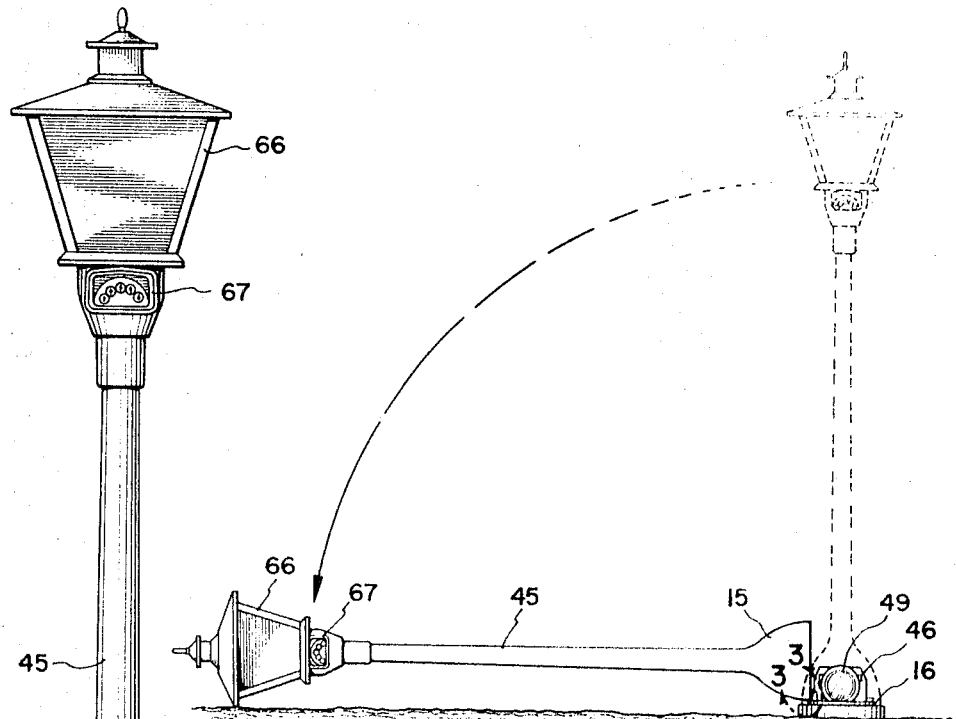
FIG. 2, a somewhat similar view drawn to a reduced scale and showing the lamppost swung to a horizontal position so as to open the meter box, the normally closed or vertical position of this lamppost-type of housing being indicated by broken lines.
Figure 3:
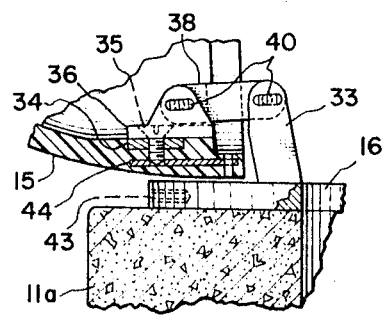
FIG. 3, a fragmentary vertical section taken on the line 3–3 of FIG. 2 to illustrate the hinge mechanism.
Figure 4:
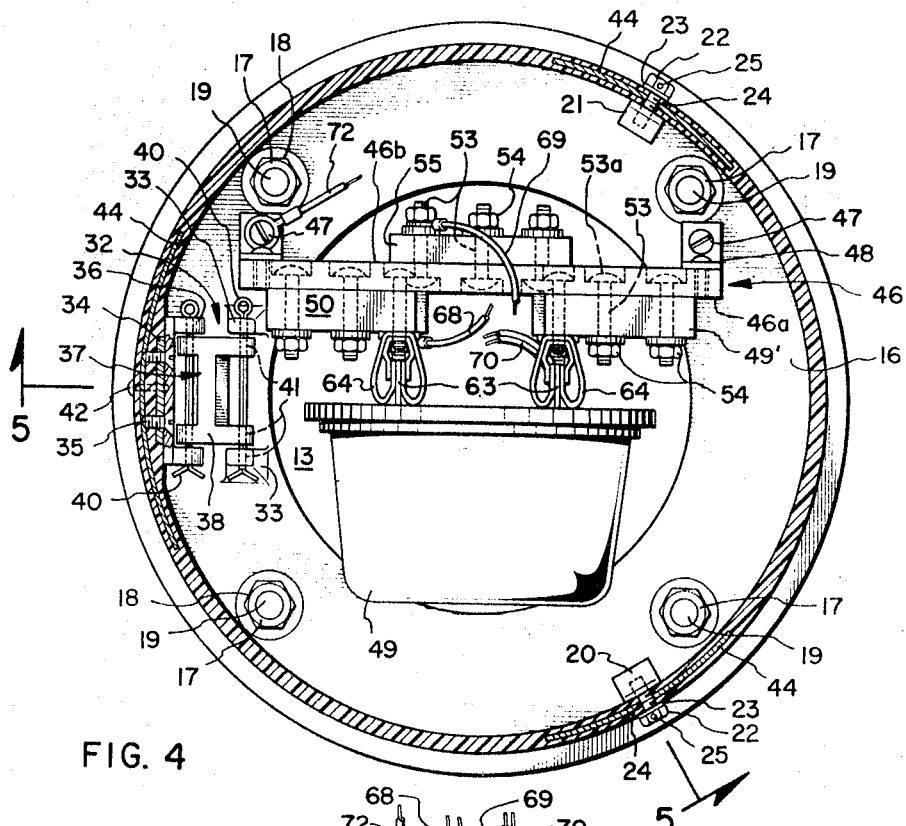
FIG. 4, a horizontal section taken on the line 4–4 of FIG. 1 and drawn to a larger scale.
Figure 5:
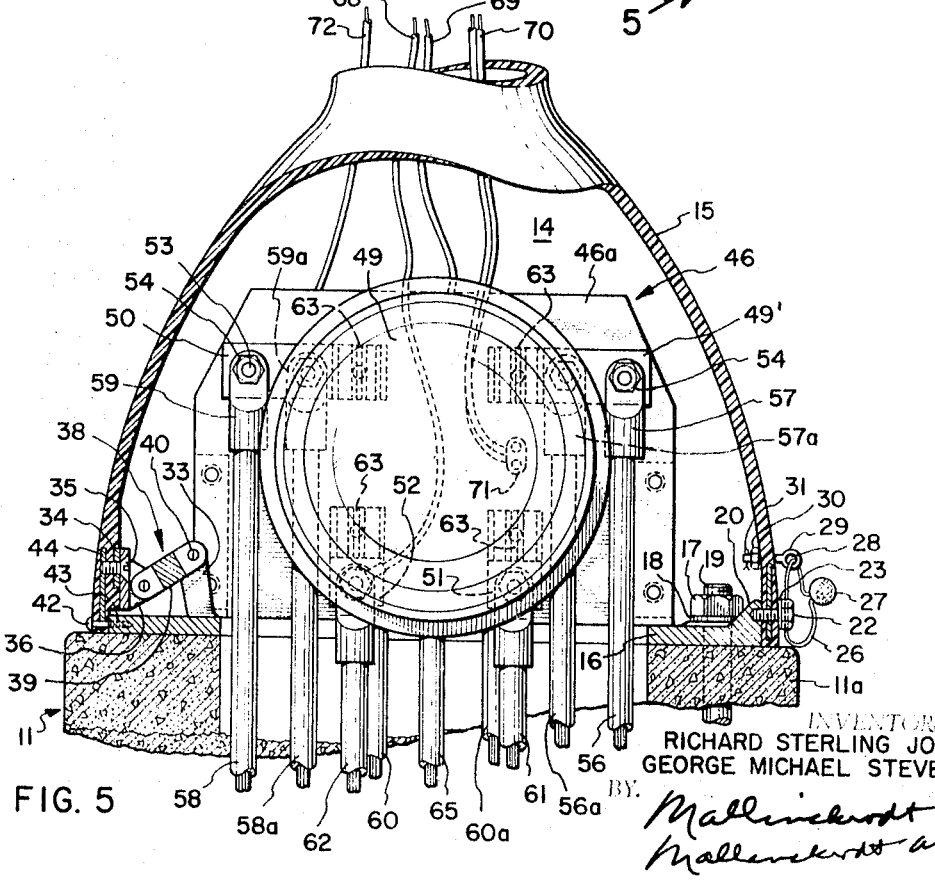
FIG. 5, a vertical section taken on the line 5–5 of FIG. 4.

Referring to FIGS. 1 through 5, a cylindrical pullbox 11 of concrete construction is installed vertically into the earth 12 above entrenched wiring (not illustrated) to provide vertical access through its hollow interior 13 from an underground wiring system into the interior 14, FIG. 5, of a meter housing portion 15. An anchoring ring 16, conveniently of cast iron, is bolted to the upper surface of pullbox 11, being held in place by nuts 17 and washers 18. Anchoring bolts 19 are embedded in the walls 11a of pullbox 11 as illustrated by FIGS. 1 and 5 so that their threaded ends project vertically upwardly through appropriately located holes in the anchoring ring 16.

As illustrated, such ring 16 includes two vertical lugs 20 and 21, spaced approximately 120° from each other and extending vertically from the outer perimeter of the ring. The housing portion 15 is anchored to the ring by bolts 22, which pass through lock washers 23 and holes 24 in the wall of the housing and are screwed into tapped holes in the lugs 20 and 21. Small holes 25 are provided transversely through the heads of the bolts 22, as shown in section by FIG. 5, to accommodate a wire 26 of a conventional utility security seal 27. The wire 26 is passed through the hole 25 and then through the eye 28 of an eye bolt 29 which is secured to the wall of housing portion 15 by means of a nut 30 and cotter key 31. In this fashion, the anchoring bolts 22 are prevented from turning out of the anchoring lugs 20 and 21, respectively.

The housing portion 15 is also connected to the anchoring ring 16, at a location between and spaced approximately 120° from the anchoring lugs 20 and 21 by a hinge 32. This hinge includes a pair of spaced, parallel members 33, FIGS. 4 and 5, fixed to and extending upwardly from the anchoring ring, and a member 34 secured to the inside wall of the housing, as by screws 35, and providing a corresponding pair of members 36 extending along the horizontal toward the center of the ring when the housing is positioned over the ring. The members 33 and 36 receive an intermediate link 37, which is made up of lugs 38 interconnected by a bar 39. The hinge lugs 38 are connected to the hinge members 33 and 36 by cotter pins 40 inserted through holes 41.

When housing portion 15 is in its normally closed position, it may be firmly secured to the anchoring ring at three points by the aforementioned bolts 22 and a screw 42 turned into a hole 43 which is tapped into the side of the anchoring ring directly beneath the hinge.

As described hereinbefore, the hinge is constructed such that it pivots at two locations spaced apart radially with respect to the anchoring ring by a sufficient distance to permit the housing to be lifted approximately vertically, until the open base of housing portion 15 clears the anchoring ring. The hinge lugs 38 are thus connected to the members 33 and 36, with sufficient looseness or "play" to permit easy operation even though slight variations in spacings of the pivot connections inevitably occur as the housing is lifted vertically.

The housing is conveniently molded from a fiber-glass-reinforced resin, e.g. a polyester resin with which are mixed short glass fibers, utilizing conventional techniques. Strips of reinforcing metal 44 may be molded into the bottom rim of housing portion 15 where desired to increase strength in regions subject to stress, particularly in the vicinity of the bolts 22 and screws 35 and 42.

The housing of FIGS. 1 through 5 constitutes a hollow lamppost 45. Its meter-receiving base portion 15 is preferably of the ornamental configuration previously referred to on its outside. Its interior opens into the interior of the post portion. When the lamppost is tipped on its side, anchoring ring 16 and its attachments are fully exposed. To tip the lamppost, it is necessary to lift it vertically until the open base of housing portion 15 clears the anchoring ring. Such vertical movement is permitted by reason of the aforedescribed construction of hinge 32.

An upstanding mounting bracket 46, usually a panel as shown, is attached to the anchoring ring 16, here by bolts 47 and L-braces 48. The panel extends vertically upwardly from a position spaced sufficiently from the center of the ring to permit adequate room for mounting a kilowatt hour meter 49. The panel is of insulating material having high tensile strength, e.g., a fiberglass-reinforced resin. On the front surface 46a of the panel are mounted electrical bus bars 49', 50, 51, and 52. They are secured by bolts 53 and nuts 54. The heads 53a of bolts 53 are recessed into the panel as illustrated in FIG. 4, and the recesses are advantageously filled with resin or other insulating material. The back mounting surface 46b of he panel carries a neutral bus bar 55 mounted in the same manner as are bus bars 49', 50, 51 and 52.

The front of panel 46 is the "hot side" and provides for junction connections with electrical power supplying conductors, as well as electrical connections for the kilowatt hour meter 49. The illustrated panel is set up for a three-wire system having one hot secondary lead cable 56 connected to bus bar 49' by means of a conventional terminal lug 57. The bus bar 49' serves to make a splice-connection of lead cable 56 with its corresponding return cable 56a through lug 57a, so that cable 56, bus bar 49', and cable 56a constitute a hot loop which enters at the base of pullbox 11, connects at panel 46, and returns to underground through the pullbox. The other hot secondary lead cable 58 is splice-connected by bus bar 50 to its corresponding return cable 58a by lugs 59 and 59a, respectively, to form a second hot loop. The secondary neutral cable 60 is splice-connected to its corresponding return cable 60a by bus bar 55 in the same manner at the neutral side 46b of the mounting bracket. Secondary hot lead cables 61 and 62 are connected to bus bars 51 and 52 by lugs, as illustrated, and are electrically junction-connected to the hot lead cables 56 and 58 by plugging the prongs 63 of the kilowatt hour meter 49 into connectors 64 mounted on the four hot-side bus bars 49', 50, 51, and 52. The service neutral cable 64 is junction-connected to the same bus bar 55 to which the secondary cable 60 is connected. The service hot cables 61 and 62 and the service neutral cable 65 are run down through the pullbox, through a trench, and into a building to connect to the main distribution panel for the building.

The lamppost 45 accommodates the necessary wiring for a luminaire 66 and a remote register 67 at the top of the post. Thus a hot wire 68 extends from one of the hot terminals 52 and a neutral wire 69 extends from the neutral bus bar 55 up the interior of the lamppost into electrical contact with a light socket (not shown). A two-wire cable 70 extends from a plug connector 71 at the back of the meter 49 to the remote register 67. A ground wire 72 connects anchoring ring 16 with the frame of the luminaire.

Figure 6:
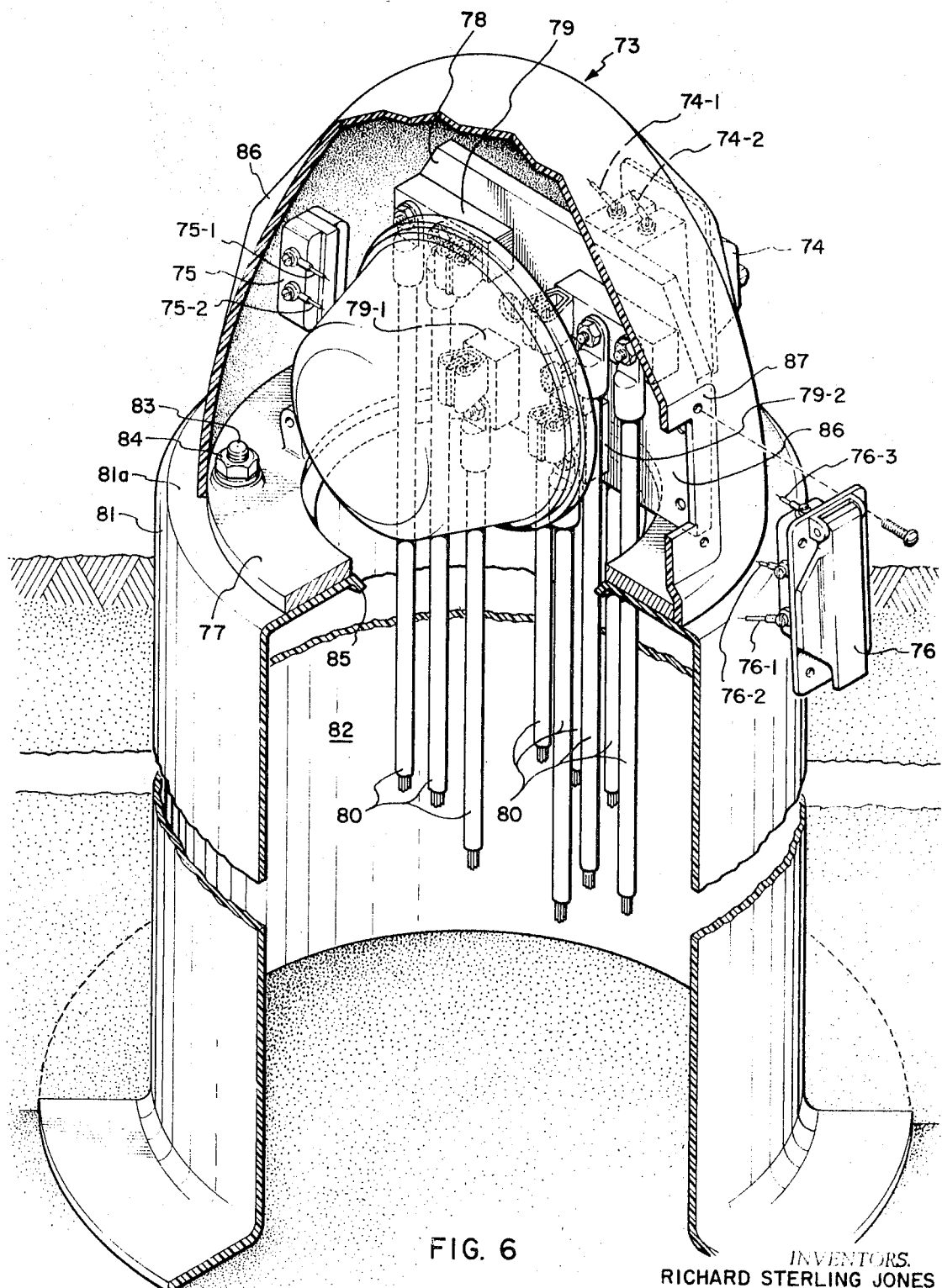
FIG. 6, an isometric view, partially in section, of another embodiment of the invention, wherein the housing is formed as a temporary power dome mounted on a pullbox of special type.

The electrical meter box of FIG. 6 serves as a temporary power dome. The internal configuration of housing dome 3 is similar to that described in connection with the housing dome portion 15 of FIGS. 1 through 5, but it is adapted for the mounting of a circuit breaker 74, a 120 volt service outlet 75, and a 240 volt service outlet 76. The anchoring ring 77, mounting bracket 78, hot side bus bars 79, neutral bus bars (not visible), and secondary and service cables 80 are identical in construction and positional relationship to the corresponding elements of the embodiment of FIGS. 1 through 5.

Because the meter box of FIG. 6 is adapted to function as a power supply source at a construction site, the internal secondary wiring as previously described is modified accordingly. Thus, hot wires are connected between the secondary bus bars 79–1 and 79–2, respectively, and the corresponding terminals 74–1 and 74–2, respectively, of the circuit breaker. Power of 120 volts is provided at outlet 75 by connecting terminal 75–1, through the circuit breaker, to terminal 74–1, and by connecting terminal 75–2 to the neutral bus bar at the back of mounting panel 78. Power of 240 volts is provided by connecting terminal 76–1, through the circuit breaker, to terminal 74–1 in the same manner as terminal 75–1 is connected; connecting terminal 76–2 through the other side of the circuit breaker to terminal 74–2; and connecting terminal 76–3 to the neutral bus bar at the back of the panel.

Housing dome 73 is secured to anchoring ring 77 in the same way that housing dome portion 15 is secured to its anchoring ring, although, because of its relatively small size, it is not normally hinged thereto.

The pullbox 81 illustrated in FIG. 6 is an approximately cylindrical closed shell open only at its ends. It is molded from a glass-fiber-reinforced resin and is an especially preferred embodiment because its relatively thin wall provides a larger interior work area 82. Moreover, its top, provided by inwardly turned flange 81a, is particularly adapted to support anchoring ring 71. As illustrated, flange 81a has a substantially larger outside diameter than either the anchoring ring or the outside of the housing dome and is sufficiently wide that the anchoring ring rests completely on its upper surface. Its internal perimeter is turned down as a reinforcing lip 85.

As shown, the anchoring ring is secured to the mounting flange by bolts 83 and nuts 84.

Figure 7:
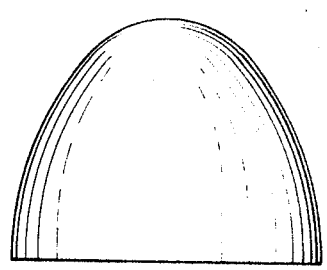
FIG. 7, a view in elevation of the housing formed merely as a protective bonnet.

In situations where neither a temporary power dome nor an outdoor lamppost is desired, a simple bonnet such as that illustrated in FIG. 7, may be used to cover the meter, the mounting panel and the associated items. The bonnet is formed essentially as is the power dome of FIG. 6, except that no receiving holes 85 or modified surface areas 86 are required for the mounting of power receptacles 75 and 76. Many other embodiments are, of course, within contemplation. For example, power outlets similar to those of FIG. 6 may be provided in the housing dome portion 15 of the lamppost of FIGS. 1—5.

We claim:

1. An electrical meter box, comprising:
   an anchoring ring for placement on top of a pullbox of the type used to provide access from the surface of the earth to underground electric cables; and
   a housing with an interior shaped and dimensioned to contain a meter mounting bracket means mounted on said ring and a kilowatt hour meter mounted on said bracket means and with an open bottom shaped and dimensioned to fit snugly around said anchoring ring so that when the housing is placed over said ring, it is necessary to move said housing vertically up until it clears the ring to disengage the housing from the ring, said housing hingedly connected to said anchoring ring by hinge means including first pivot connection fixed to the inside and near the bottom of said housing, a second pivot connection fixed to the ring and a link pivotally interconnecting said pivot connections wherein the pivot connections are spaced apart sufficiently to permit the aforementioned vertical movement of said housing.

2. An electrical meter box according to claim 1 wherein the interior of the housing is of domelike configuration such that when in closed position, a curved line traced vertically on the interior surface of the housing beginning at any point on the perimeter of the ring and terminating above the center of the ring has a radius of curvature equal to the distance between its beginning point, through said center, to the point on the perimeter of the ring that is directly opposite said beginning point; and wherein the hinge means is positioned within the housing in the closed position thereof.

3. An electrical meter box according to claim 1, wherein the housing includes a hollow lamppost portion extending upwardly from the top of a base portion of domelike configuration.

4. An electrical meter box according to claim 1, wherein the housing includes a hollow lamppost portion and an electrical luminaire and a visual meter register are carried by the lamppost portion of the housing.

5. Apparatus for mounting a kilowatt hour meter, comprising an anchoring ring for placement on top of a pullbox of the type used to provide access from the surface of the earth to underground electric cables, the inner perimeter of said ring embracing sufficient area to provide working access through the ring into such a pullbox when the ring is mounted thereon so that secondary and service conductors may be brought up through said ring for connection above said ring; meter-mounting bracket means fixed to said anchoring ring in a position to support a kilowatt hour meter above said ring and entirely within the outer perimeter of said ring; a housing shaped as a dome having an open bottom shaped and dimensioned to fit over said anchoring ring, positioned over said anchoring ring so that it can be removed relative thereto to completely expose said bracket means, the interior of said housing being shaped and dimensioned to contain the said anchoring ring and bracket means, leaving space for the support of a kilowatt hour meter on the bracket means within the housing when the housing is positioned over the anchoring ring; electrical connection means mounted on said bracket means; and electrical outlets provided in the wall of said housing and electrically connected to said electrical connection means.

6. A pullbox for installation in the earth to provide access from the earth's surface to power cables buried in a trench, comprising an approximately cylindrical shell of sufficient length to extend from the vicinity of the trench to the vicinity of the surface of the earth, with inside diameter sufficiently great to accommodate a plurality of electric cables, having a relatively thin wall and an upper mounting flange extending inward from the top of said wall to provide a mounting surface adapted to carry means for anchoring a kilowatt hour meter and associated electrical apparatus, the inner perimeter of said mounting flange being formed as a dependingly shaped reinforcing lip.

UNITED STATES PATENT OFFICE
CERTIFICATE OF CORRECTION

Patent No. 3,596,141            Dated July 27, 1971

Inventor(s) Richard Sterling Jones and George Michael Stevenson

It is certified that error appears in the above-identified patent and that said Letters Patent are hereby corrected as shown below:

The filing date [22] of the application should be corrected to read ---October 28, 1968---.

Signed and sealed this 1st day of August 1972.

(SEAL)
Attest:

EDWARD M. FLETCHER, JR.        ROBERT GOTTSCHALK
Attesting Officer                Commissioner of Patents